United States Patent
Koch et al.

[11] 3,900,356
[45] Aug. 19, 1975

[54] METHOD FOR MAKING A CELLULAR CUSHIONING STRUCTURE

[75] Inventors: Walter T. Koch, Havertown, Pa.; Eugene G. Horsky, Claymont, Del.

[73] Assignee: FMC Corporation, Philadelphia, Pa.

[22] Filed: Mar. 28, 1973

[21] Appl. No.: 345,768

[52] U.S. Cl. .......... 156/145; 156/290; 156/292; 428/76
[51] Int. Cl. .......................... B32b 31/06
[58] Field of Search .......... 156/164, 197, 290, 292, 156/85, 81, 77, 145, 206; 161/406; 426/127; 93/1

[56] References Cited
UNITED STATES PATENTS

| | | | |
|---|---|---|---|
| 2,429,177 | 10/1947 | Young | 156/164 |
| 3,366,523 | 1/1968 | Weber | 156/145 |
| 3,405,020 | 10/1968 | Chavannes | 156/219 |
| 3,414,181 | 12/1968 | Sloan | 164/402 |
| 3,574,109 | 4/1971 | Yoshikawa | 156/85 |
| 3,575,757 | 4/1971 | Smith | 156/145 |
| 3,655,502 | 4/1972 | Yoshikawa | 156/85 |
| 3,660,189 | 5/1972 | Troy | 156/145 |

Primary Examiner—George F. Lesmes
Assistant Examiner—R. J. Roche

[57] ABSTRACT

A method for making a three-ply, cellular cushioning structure within which is contained a fluid under pressure, with the intermediate ply being of corrugated configuration and sealed to the respective outer plies at its crests and valleys.

8 Claims, 8 Drawing Figures

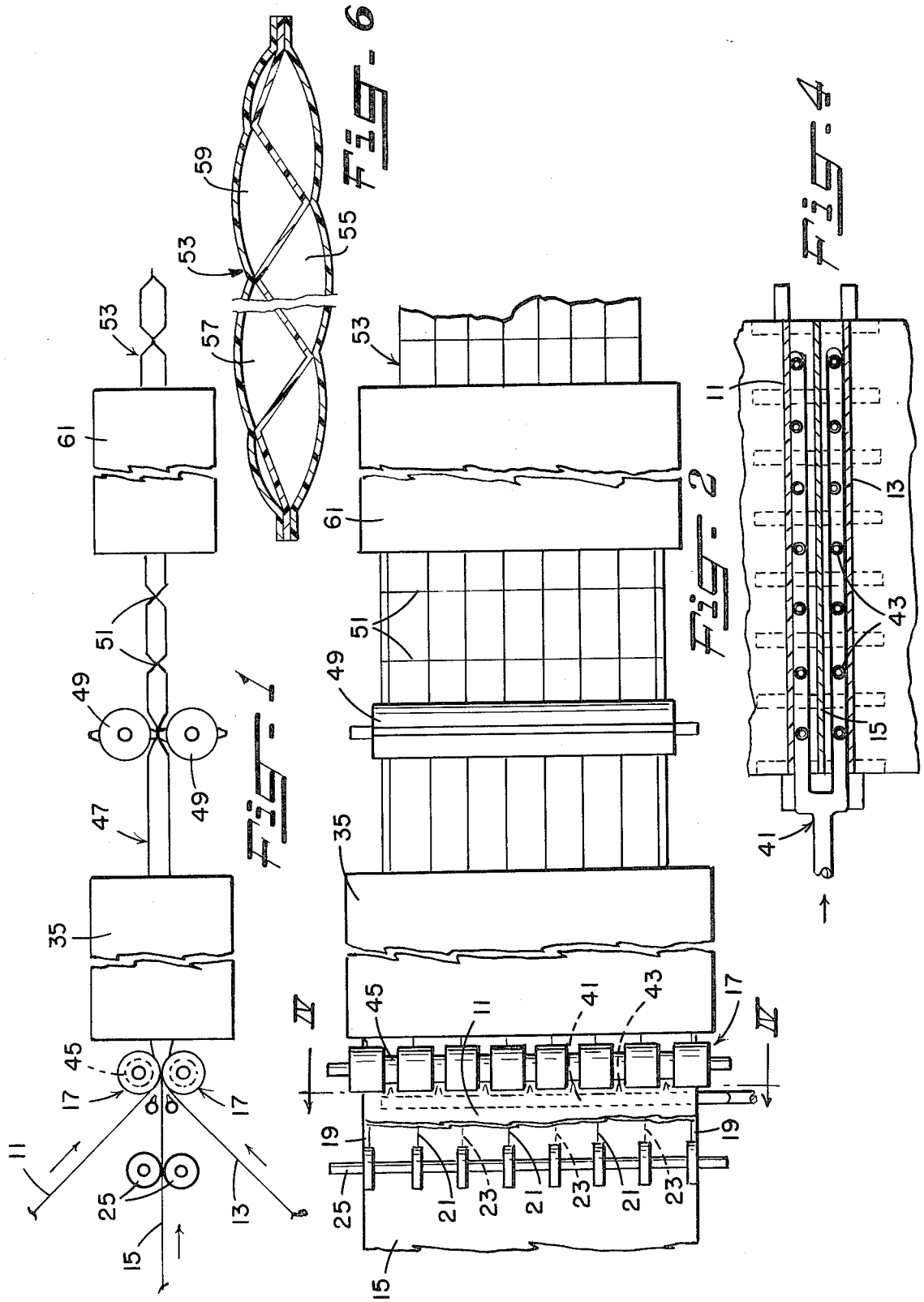

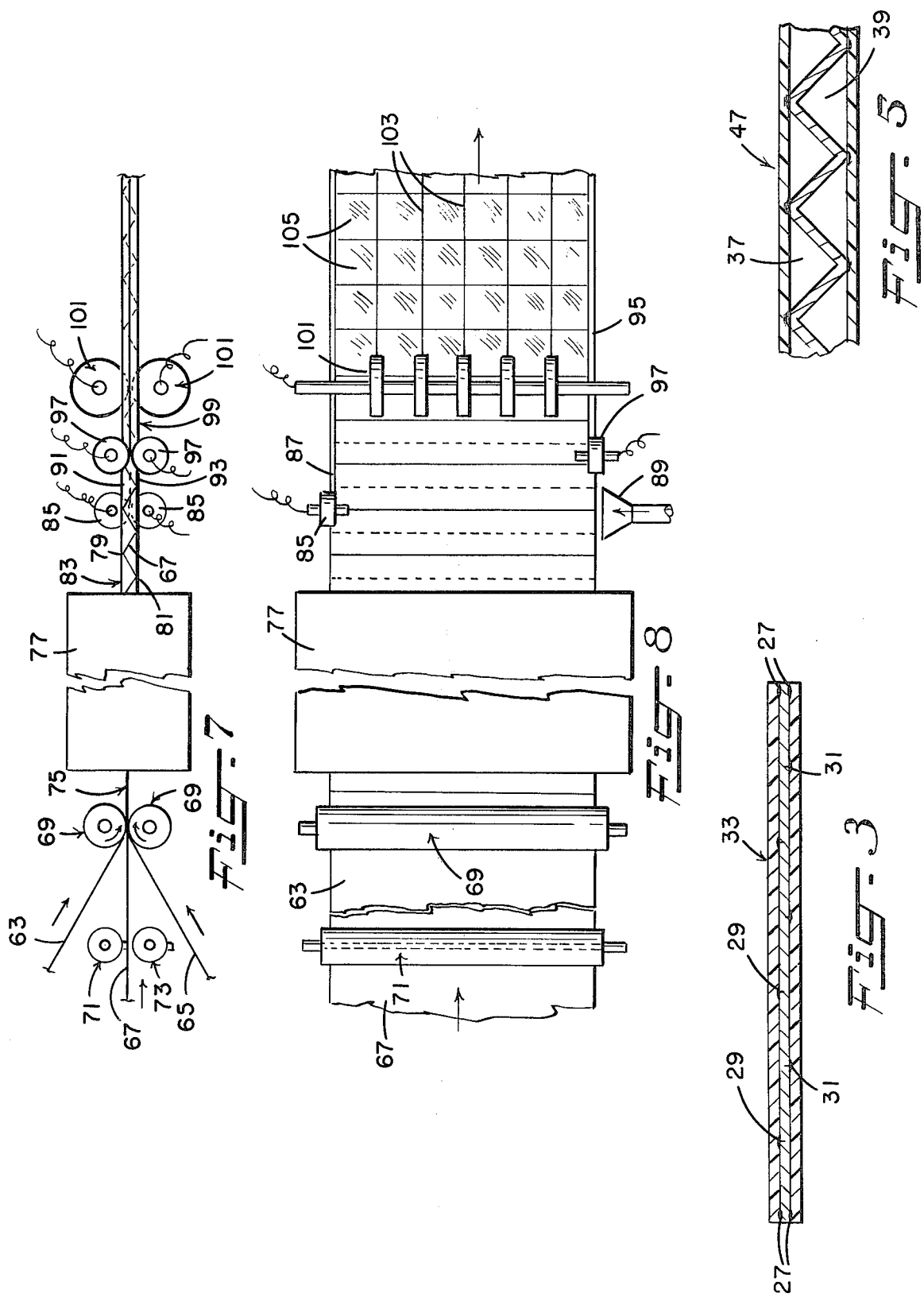

METHOD FOR MAKING A CELLULAR CUSHIONING STRUCTURE

The present invention is directed to a method for making a cellular cushioning structure.

U.S. Pat. Nos. 3,392,081; 3,415,711; 3,405,020; 3,514,362; 3,508,992; and 3,616,155 are representative of prior art disclosures relating to cellular cushioning material which in general includes a flat surface and a surface having a plurality of sealed embossments within which air is entrapped. Basically, such known cushioning materials are made by simply heating and applying a vacuum to a plastic film while it is engaged with the periphery of an embossing roller. With the now embossed film still engaged with such roller, a flat film is laminated to its exposed side to thereby entrap air within the embossments.

In the practice of the above described method, the alternate heating and cooling of the film during the embossing and laminating stages involves a rather slow and costly operation. Further, a separate, expensive embossing roller must be employed when a change in the embossment pattern, size and/or shaping is desired. Accordingly, a primary object of the present invention is to provide for a generally new or improved and more satisfactory method for making a cellular cushioning structure.

Another object is to provide a method for making an improved cushioning and thermal insulating structure having a plurality of independent hermetically sealed cells within which is contained a fluid under pressure.

Still another object is to provide a method for making an improved cushioning structure having a fluid under a desired pressure entrapped within each of a plurality of independent, hermetically sealed pockets.

A further object is to provide a new or improved method for making cellular cushioning structures having pockets within each of which is contained a fluid under a desired pressure.

A still further object is the provision of an improved, economical and simple method for making cellular cushioning structures.

These and other objects are accomplished in accordance with the method of the present invention which provides a cellular structure comprised of a pair of plies formed of flexible, fluid-impermeable film between which is contained a fluid under pressure greater than that of the ambient atmosphere, and a flexible ply of corrugated configuration located between and sealed to the respective film plies at its crests and valleys. Preferably, the contained fluid is a gas which is under a pressure sufficient to tension and bow the portions of the film plies away from each other.

The corrugated or intermediate ply may be fluid-permeable whereby it serves to restrict the separation of the outer film plies under the pressure of the contained fluid. Alternatively, such corrugated ply may be a fluid-impermeable film which is hermetically sealed to the outer films at its crests and valleys so as to partition the space between such outer plies into similar but independent cells within each of which the contained fluid under pressure is entrapped.

Desirably, and particularly where the corrugated ply is in the form of a fluid-impermeable film, the three plies are hermetically sealed to each other along continuous areas which are spaced from each other and extend at right angles to the corrugations in the intermediate ply to thereby entrap the contained fluid under pressure within individual, spaced pockets.

In the method of the present invention, like plies of uniaxially oriented thermoplastic polymeric films are sealed in planar relationship to the opposite sides of an intermediate flexible ply along continuous areas which are spaced from each other and extend substantially at right angles to the direction of film orientation, with the areas at which the respective film plies are sealed to the intermediate ply being in alternating relationship with each other. These overlapping plies are then heated to shrink and at least partially relax the orientation in the films, afterwhich a fluid, preferably a gas, under a pressure greater than that of the ambient atmosphere is contained between the film plies whereby the intermediate ply is urged into a corrugated configuration. Desirably, but not necessarily, the intermediate ply may be fluid-impermeable so as to partition the space between the film plies into individual, elongated cells within which the contained fluid is entrapped.

The film plies may be only partially relaxed during the heating of the overlapping plies and may be completely relaxed after the fluid under pressure is contained between the film plies to thereby more snugly encase the contained fluid. Desirably, the intermediate ply may also be a thermoplastic polymeric film which is uniaxially oriented, preferably in the same direction as the outer film plies, and which is capable of relaxing only when heated to a temperature greater than that at which the outer film plies will shrink. Upon containing the fluid under pressure between the outer film plies, the structure thus provided is simply heated to effect, alone or together with the outer plies, relaxation of the intermediate ply to thereby achieve a more snug encasement of the contained fluid.

In the most preferred method of the present invention, the intermediate ply is a fluid-impermeable, thermoplastic polymeric film which is hermetically sealed to the outer films so as to initially partition the space between such outer films into a plurality of individual cells within which the contained fluid under pressure is encased. The outer and intermediate film plies are then hermetically bonded together along continuous areas which are spaced from each other and extend at substantially right angles to the corrugations in the intermediate ply so as to provide a series of independent, spaced but hingedly-connected pockets within which the fluid under pressure is entrapped. In this procedure, the outer film plies may be partially relaxed during the initial heating of the overlapping plies and may be completely shrunk after the fluid under pressure is contained and either before or after the entrappment of such fluid in the independent pockets. Similarly, if the molecules of the intermediate film ply are uniaxially oriented, relaxation thereof may be achieved either before or after the entrappment of the fluid which is contained between the outer films.

The shrinkable film plies employed in the structure of the present invention can be formed of any thermoplastic polymeric material which can be oriented, as by stretching, and include such materials as polyethylene, polypropylene, polyesters, nylon, polyvinyl chloride, polyvinylidene, etc. The orientation of the outer film plies and of the intermediate ply, when appropriate, extends only along one common direction thereof and, at least in the outer film plies is preferably to the same degree.

An intermediate film which is intended to be shrunk may be formed of the same thermoplastic polymeric material as that of the outer plies and be oriented to a greater degree so as to undergo complete relaxation only when heated to a temperature higher than that at which such outer plies are completely shrunk. Alternately, such intermediate ply may be a uniaxially oriented film formed of a thermoplastic polymeric material which differs from that of the outer plies and which is adapted to relax only when heated to a temperature greater than the relaxation temperature of the outer plies.

In all embodiments of the invention described, shrinkage or relaxation of oriented plies is achieved by applying heat from any suitable source, desirably to only the unsealed or free areas of such plies.

The intermediate ply must be flexible but need not be shrinkable and may be formed, for example, from paper, cellophane, fabrics, foamed plastics, etc. Such materials may be coated or laminated to impart fluid-impermeablility and/or heat-sealability thereto, if so desired. Flexibility of the intermediate ply may be enhanced by creasing, scoring or impressing the same on one or both sides thereof along preferred fold lines so as to assure that such ply can readily assume a desired corrugated configuration.

As heretofore mentioned, the fluid under pressure contained between the outer films is preferably a gas. From the standpoint of economy and thermal insulating properties, air is preferred. If one or both outer film plies are transparent or translucent, a coloring material may be incorporated into such gas for decorative or identification purposes. Moreover, such fluid or gas may be cooled to a temperature below that of the ambient atmosphere prior to its containment between the outer film plies so as to exert a still greater pressure on the walls of the formal cells or pockets as it subsequently assumes heat from such ambient atmosphere and expands.

Sealing or bonding of the plies may be effected by solvents, adhesives, heat, sonic or ultra-sonic vibrations or by any other means which can provide for adherence of the overlying plies along the desired areas without weakening or excessive distortion, particularly of the oriented films.

For the sake of simplicity and ease of description, the method of the present invention is hereafter described as employed in the manufacture of cushioning structures having a pair of outer plies and an intermediate ply formed of flexible fluidimpermeable films formed of thermoplastic polymeric materials with only the outer plies being oriented, uniaxially, in the same direction and to the same degree. In addition, all bonds or seals between any of the plies of the cushioning structures are such as to hermetically isolate from each other the cells or pockets which are thereby formed.

In the drawing,

FIG. 1 is a diagrammatic side view of an apparatus as employed in the practice of the method of the present invention;

FIG. 2 is a plan view of the apparatus shown in FIG. 1;

FIG. 3 is a vertical section through the product formed with the apparatus shown in FIGS. 1 and 2 during an intermediate stage of the method of the present invention;

FIG. 4 is a vertical section taken substantially along the line IV—IV of FIG. 2;

FIG. 5 is a vertical section illustrating the product shown in FIG. 3 during a subsequent stage of the disclosed method;

FIG. 6 is a vertical section taken along a portion of the cellular structure formed by the method of the present invention;

FIG. 7 is a view similar to FIG. 1 showing a modified form of apparatus which is adapted for use with the method of the present invention; and FIG. 8 is a plan view of the apparatus shown in FIG. 7.

Referring to FIGS. 1–3, continuous, flat, transversely oriented thermoplastic polymeric films 11 and 13 are engaged with the opposite sides of a like, but unoriented, film 15 and passed into a nip formed by pressure rolls 17. Prior to such engagement, continuous bands of adhesive, as indicated by lines 19, 21 and 23 are applied by rolls 25 to opposite sides of the film 15, with such adhesive bands extending at substantially right angles to the direction of orientation of the films 11 and 13. The adhesive bands 19 extend along opposite sides of the film 15, while the adhesive bands 21 and 23 are disposed only along the respective top and bottom surfaces of such film. Thus, the adhesive bands 21 along one side of the film 15 are in alternate or staggered relationship with the bands 23 applied to the opposite sides of this film.

Upon passage between the pressure rolls 17 the adhesive bands 19 on both sides of the film 15 are engaged snugly with the films 11 and 13 to provide edge seals or bands 27, as shown in FIG. 3. Concomitantly, by means of the adhesive bands 21 and 23 the film 15 is sealed or bonded at 29 to the film 11 and at 31 to the film 13. In the laminated structure or product 33 illustrated in FIG. 3, the films 11, 13, and 15 are in flat or planar relationship, with the seals or bonds 29 being staggered relative to the seals or bonds 31. This laminated product 33 may be collected in roll form by suitable means, not shown, for future use.

In the continuous method illustrated, upon leaving the rolls 17 the laminated product 33 is advanced through an oven 35 where the outermost films 11 and 13 are at least partially relaxed from their oriented condition. With the transverse shrinkage of the films 11 and 13 the seals 27, 29 and 31 are drawn closer to each other and thereby introducing considerable slack in the film 15.

Concomitantly with the heating and shrinkage thereof, air or other gas is delivered under a pressure greater than that of the ambient atmosphere inbetween the films 11 and 13, causing the film 15 to assume a corrugated configuration and, as shown in FIG. 5, cooperating with the films 11 and 13 to define a series of elongated cells 37 and 39. This delivery of air under pressure may be achieved as shown in FIG. 4, using a manifold 41 having a series of nozzles 43 which are aligned with and extend into annular recesses 45 formed in the periphery of the rolls 17. With this arrangement, there is no interference with the sealing of the films 11, 13 and 15 in planar relationship and, also, the backflow and escape of gas is minimized.

Beyond the oven 35, the inflated cellular product, indicated at 47, is passed between heated sealing rolls 49 which together cooperate to bond the films 11 and 13 to the film 15 at longitudinally spaced areas 51 which extend at substantially right angles to the seals 27, 29 and 31. The resulting product 53 exhibits good flexibility along both axial directions and, as shown in FIG. 6, consists of a plurality of individual pockets, such as indicated at 55, 57 and 59, within which the air is entrapped.

Bonding of the cellular structure 47 as described above will, of course, compress the contained gas to some degree. Further compression of such gas can be achieved by passing the product 53 into and through a second oven 61 to effect substantially complete transverse shrinkage of the films 11 and 13.

In lieu of transversely oriented films 11 and 13, thermoplastic polymeric films which have been uniaxially oriented in the longitudinal direction are equally applicable for use in the method of the present invention.

As shown in FIGS. 7 and 8, longitudinally oriented thermoplastic films 63 and 65 are engaged with the opposite sides of a similar but unoriented film 67 and passed into the nip formed by rolls 69. Prior to such engagement, applicator rolls 71 and 73 alternately deposit bands of adhesive onto the opposite sides of the film 67 along lines extending substantially perpendicular to the direction of orientation in the films 63 and 65. At the areas of applied adhesive the film 67 is bonded in planar relationship to the films 63 and 65 during passage between the rolls 69 to provide a laminated structure 75 which may be collected for future use.

In the continuous process illustrated, the laminated structure is passed through an oven 77 to heat and at least partially shrink the films 63 and 65 in the longitudinal direction. As a result of this shrinkage, the film 67, being sealed to the film 63 at 79 and to the film 65 at 81, becomes slack and subsequently assumes a corrugated configuration as a gas, preferably air, is delivered inbetween the films 63 and 65 under a pressure greater than that of the ambient atmosphere.

The laminated structure, now indicated by the character 83, which issues from the oven 77 is passed between heated rolls 85 which together seal one longitudinal edge thereof at 87. A gas under pressure is delivered into the structure 83 from its opposite longitudinal edge by a nozzle 89 whereupon the film 67 assumes a corrugated configuration and partitions the structure 83 into cells 91 and 93. It will be noted that the nozzle 89 is positioned to deliver the gas under pressure into portions of the structure 83 which have been sealed at 87 and also to trailing unsealed portions thereof. In this manner the structure 83 may be flushed before being sealed when it is desired to contain a gas other than air between the films 63 and 65.

Once expanded by the delivered gas, the structure 83 is sealed at 95 by heated rolls 97 to provide a structure 99 in which the delivered gas is completely contained within the cells 91 and 93. This structure 99 is then passed between rolls 101 which seal the same longitudinally at 103 whereby the gas contained therein is entrapped in individual pockets 105. If further shrinkage of the films 63 and 65 is possible, the resulting structure may be passed through a second oven, as shown at 61.

As heretofore mentioned, the laminated products or structures 33 and 75 may be collected and may be subsequently converted into the cellular cushioning structures of the present invention. Since the laminated product 33 is sealed at transversely spaced intervals along its entire length, the conversion of such product into a cellular structure would necessarily be on a sectional or piece basis following the procedure as described with reference to FIGS. 1–6. The laminated structure 75, however, can be converted on a continuous basis following the teachings illustrated in FIGS. 7 and 8.

It is to be understood that changes and variations may be made without departing from the spirit and scope of the invention as defined in the appended claims.

We claim:

1. A method of making a cellular structure including the steps of sealing like plies of uniaxially oriented thermoplastic polymeric films in planar relationship to the opposite sides of an intermediate flexible ply along continuous areas which are spaced from each other and extend at substantially right angles to the direction of film orientation with the areas at which the respective film plies are sealed to the intermediate ply being in alternating relationship with each other, heating the overlapping plies to at least partially relax the orientation in the films, and delivering and containing between the intermediate ply and each of the film plies a fluid which is under a pressure greater than that of the ambient atmosphere whereby the intermediate ply is urged into a corrugated configuration.

2. A method as defined in claim 1 further including the step of bonding the film plies to the intermediate ply together along continuous areas which are spaced from each other and extend at substantially right angles to the corrugations in the intermediate ply.

3. A method as defined in claim 2 wherein said fluid is a gas.

4. A method as defined in claim 1 wherein the film plies are only partially relaxed during the heating thereof, and further including the step of heating the overlapping plies after the fluid under pressure is delivered and contained therebetween to further relax the orientation in the films.

5. A method as defined in claim 3 wherein the film plies are only partially relaxed during the heating thereof, and further including the step of heating the overlapping plies after bonding the same to further relax the orientation in the films.

6. A method as defined in claim 3 wherein the intermediate ply is a fluid-impermeable thermoplastic polymeric film.

7. A method as defined in claim 3 wherein the intermediate ply is a fluid permeable web.

8. A method as defined in claim 6 wherein the intermediate film is molecularly oriented at least along one axial direction and is capable of retaining such orientation when heated to the temperature at which the orientation in the outermost film plies is relaxed, and further including the step of heating the overlapping plies after the fluid under pressure is delivered and contained therebetween to effect at least partial relaxation of the orientation in the intermediate film.

* * * * *

UNITED STATES PATENT OFFICE
CERTIFICATE OF CORRECTION

PATENT NO. : 3,900,356
DATED : August 19, 1975
INVENTOR(S) : Walter T. Koch and Eugene G. Horsky It is certified that error appears in the above-identified patent and that said Letters Patent are hereby corrected as shown below:

Col. 3, line 51, "fluidimpermeable" should read --fluid-impermeable--.
Col. 5, line 10, "p ssing" should reading --passing--.

Signed and Sealed this thirtieth Day of December 1975

[SEAL]

Attest:

RUTH C. MASON
Attesting Officer

C. MARSHALL DANN
Commissioner of Patents and Trademarks